United States Patent [19]
Ham et al.

[11] 3,933,474
[45] Jan. 20, 1976

[54] LEECH ALLOYING

[75] Inventors: John L. Ham, Wellesley; John G. Gorsuch, Brockton, both of Mass.

[73] Assignee: Norton Company, Worcester, Mass.

[22] Filed: Mar. 27, 1974

[21] Appl. No.: 455,201

[52] U.S. Cl. .................................... 75/10 R; 75/65
[51] Int. Cl.² ........................................ C22B 4/00
[58] Field of Search ................................ 75/10, 65

[56] References Cited
UNITED STATES PATENTS

| | | | |
|---|---|---|---|
| 2,813,921 | 11/1957 | Vordahl | 75/10 C |
| 3,125,441 | 3/1964 | Lafferty | 75/65 ZM |
| 3,305,923 | 2/1967 | Zimmer | 75/10 R |
| 3,565,602 | 2/1971 | Konisi | 75/10 C |
| 3,773,409 | 11/1973 | Melnikov | 75/65 ZM |
| 3,773,499 | 11/1973 | Melnikov | 75/65 ZM |

*Primary Examiner*—Peter D. Rosenberg
*Attorney, Agent, or Firm*—Jerry Cohen

[57] ABSTRACT

Alloys are produced from an elongated metal bar comprising a substantially pure majority metal by attaching a length series of surface patches thereto made of compacted powder mixtures of minority alloying elements and the majority metal, then progressively melting the bar along its length to produce a compositionally uniform alloy melt and solidifying the melt to produce an alloy ingot. The process results in ingots of uniform composition consistent with use of relatively volatile minority alloying elements.

15 Claims, 1 Drawing Figure

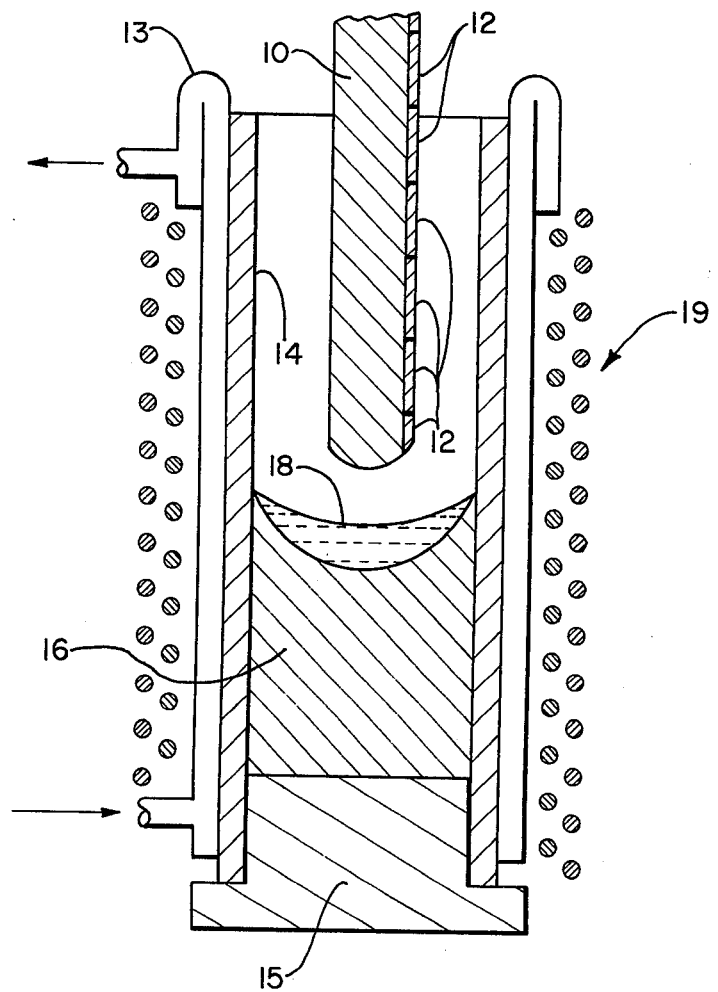

LEECH ALLOYING

BACKGROUND OF THE INVENTION

The present invention relates to production of alloys, and more particularly to the production of alloyed refractory metal mill products.

It is an important object of the present invention to improve the fabricability, toughness and/or high temperature creep and grain growth resistance of metals.

It is a further object of the invention to produce compositional uniformity throughout an alloy mass consistent with one or more of the preceding objects.

It is a further object of the invention to reduce the complexity and cost of alloy casting methods consistent with one or more of the preceding objects.

It is a further object of the invention to provide controlled alloying additions consistent with one or more of the preceding objects.

It is a further object of the invention to achieve one or more of the preceding objects using simple apparatus and techniques.

SUMMARY OF THE INVENTION

The alloys to be produced in accordance with the invention comprise a majority metal and one or more minority alloying ingredients. The majority metal may comprise a metal selected from the class consisting of the elements: tantalum, columbium, molybdenum, hafnium, zirconium, tungsten, and alloys containing one or more of such elements as more than 80 weight percent thereof, preferably elemental tantalum ingots with usual impurity levels for first melt arc or electron beam cast ingots. The minority alloying ingredients may comprise metals and non-metals.

Patches of compacted powders of the majority metal and minority ingredients are made up in proportions of minority alloying ingredients substantially greater than the proportion thereof to be obtained in the final alloy. An elongated bar of the majority metal is formed and the patches are bonded to the surface thereof along the length of the bar. The thickness of the patches is less than one-fourth and preferably less than one-tenth the diameter or other cross-section thickness dimension of the bar. Preferably the bar is formed as an arc of electron beam melt electrode and the patches, having a leech-like elongated form, are fastened along one or both sides of the electrode without interruption or overlap by uninterrupted T.I.G. (tungsten electrode inert gas) type welds preferably made in an enclosed argon filled chamber. The patches may be distributed in any manner representing constant gross cross-sectional composition.

The bar is melted along its length and the molten material is dripped into a mold and collected under high energy conditions which together with electromagnetic or other mixing steps, promote mixing of molten ingredients before their solidification.

The solidified alloy, preferably in the form of an elongated ingot, can be forged and otherwise worked to final mill product form. It has been found that improved control of alloying ingredient addition is obtained compared to fabrication of alloy products through powder metallurgy or compared to alloy products formed by arc casting elongated electrodes with doping ingredients inserted in longitudinal sawed slots. In the above described melting for dispersion mixing of alloying ingredients according to the present invention, the patches melt at their ends at the same rate as the host bar, thereby affording a controlled metered feed of minority alloying ingredients into the molten pool.

Due to the high melting point of refractory metals, any addition that is made in bulk elemental form, without the metering control of the present invention, would melt long before the associated tantalum and give random uncontrolled additions to the molten pool. The fine particulate admixture of patches provided in accordance with the invention controls this melting, acting as a sponge or wick to retain the addition until release is appropriate. A further advantage of the practice of the present invention in connection with arc melting is that the controlled progressive addition of minority ingredients allows control of arc current which otherwise would go out of control every time a discrete increment of relatively low melting, low boiling element was added.

In selecting the portions of components of the patches, the majority metals should comprise at least 50, preferably 80, weight percent of the patch and its exact composition should be selected, making allowance for percent retention of minority alloying ingredients in the course of processing and amount of such alloying ingredients already contained in the bar as impurity components or otherwise.

BRIEF DESCRIPTION OF THE DRAWING

Other objects, features and advantages of the invention will be apparent from the following description of preferred embodiments taken in connection with the accompanying drawing, the single FIGURE of which is a schematic cross-sectional view of an arc melting apparatus for a process carried out with a patched electrode product in accordance with a preferred embodiment of the invention.

DETAILED DESCRIPTION OF PREFERRED EMBODIMENTS

The drawing shows an arc melt electrode 10 with leech-like patches 12 serially arranged along the length of the electrode on one side thereof and welded thereto by uninterrupted seam welds. An arc casting cooling jacket 13 with an inner wall 14 and a stool 15 provide an arc mold for a forming ingot 16 with a molten pool 18 on top of the ingot. There is sufficient energy in arc melting processes together with vigorous circular electromagnetic stirring by stirring coil 19 to insure dispersion of the majority metal from bar 10 and patches 12 with the alloying ingredients introduced through 12. The melting process may or may not be of the type where the stool is pulled down as the final ingot forms.

The alloy patches have a lower melting point than the host electrode so that they do not form projections beyond the melting electrode end. Melting back of the patches beyond the electrode end is a self limiting process. If and when a patch melts back beyond the end of the arc melt electrode, the patch end retreats to a region of temperature below its own melting point.

The melting may alternatively be carried out through electron beam impingement in lieu of arcing, preferably supplemented by electromagnetic energizing of the molten pool to promote stirring therein.

The patches are made by conventional isostatic or die pressing methods from a homogeneous mixture of the powders of the majority and minority alloying elements. To maximize the strength of the patch, structured powders having sharp corners, limbs and/or elongated form, should be used rather than equiaxed plain particulate materials to give green handling strength at pressures between 10,000 and 15,000 psi.

The patches are inherently sintered in the course of welding. Such sintering increases the strength of powder to powder bonds within the patch and reduces the likelihood of premature feed of patch components into the molten pool during the melting step. The green strength is sufficient to hold the patch together in handling up to and through assembly with the host electrode and initiation of the above described sintering-/welding step.

The electrode 10, patches 12 and the welding bonds therebetween are so constructed that substantially all mass transfer of metal from the composite 10/12 to molten pool 18 takes place through transfer of molten metal from the ends of electrode 10 and the then endmost patch 12 and essentially simultaneously from both sources. In addition to providing controlled uniform feed of alloying components to the melt, the construction limits evaporation of more volatile alloying components through the thin cross-section area construction of the patches limiting heat transfer along the axial lengths thereof. Typically the leech form patches may comprise rectangular cross-section rods of one-fourth to three-fourths inch wide by one-fourth to three-fourths inch high and lengths of one-half to 2 feet.

The green patch(es) may be heated to presinter then to increase their strength for such purposes as rougher handling of the patch shipping and/or storage for later use.

The arc melt electrode 10 may be made as a first melt arc melted or electron beam melted ingot derived from a loose granular feed, powder metallurgy compact or previously cast electrode or as a direct powder metallurgy compact. The form of any such electrode may be modified by mechanical working or cutting.

While a single row of end to end elongated patches is satisfactory for most purposes, two such rows spaced 180° apart or a staggered arrangement of patches may be employed to increase the amount of minority ingredients introduced to compensate warping (either during the patch bonding or subsequent melting processes), or to allow for particular conditions of electrode resistance, electrode or final ingot diameters, or of melting or stirring. Any such arrangement must be made compatible with electrode feed, guiding or sealing mechanisms.

The practice of the invention is further illustrated by the following non-limiting examples.

EXAMPLE 1

An initial tantalum bar 10 feet long, was formed by arc melting and forging. Patches were made up to provide alloying doping of carbon, silicon, iron, nickel, niobium and yttrium to the ingot. The impurity content of the ingot is indicated in line A of Table I below and the amount of added alloying ingredients is indicated in line B. The yttrium was introduced as yttrium oxide of such weight as to add 400 ppm yttrium to the total since metallic yttrium powder is expensive and unstable in air, and since the relatively small amount (108 ppm) of unwanted oxygen added as yttrium oxide is lost during melting. The other dopants were in elemental form. To form the patches the required amounts of each dopant were weighed out and mixed together with 87% of tantalum (by weight of the total tantalum and dopant powders). The whole patches were then isostatically pressed at 10,000 psi to form eight 15 inch long patches ensuring an equal distribution of material along the whole length of the electrode.

The patches were welded on to the ingot as a length series on one side thereof with uninterrupted T.I.G. welds on both sides of the patches (i.e., at corners of the patches in tangential contact with the ingot). Welding was accomplished in a dry box and the heat of welding sintered the patches so as to materially increase their strength and resistance to breakage.

The patched ingot was used as a consumable electrode in a consumable electrode ("consutrode") arc melting process and melted to produce a final ingot. Melting current was 1500–2500 amperes per inch of ingot diameter and the strength of the magnetic stirring field was 24 Oersteds.

A single row of patches in a straight line gave good uniformity and minority ingredient retention. The total of alloying ingredients going into the melting as indicated by line C "total composite electrode" in Table I and the finally obtained alloying ingredients as determined by analysis of the final ingot is shown in line D. Percent retention of alloying ingredients is shown in line E.

TABLE I

|  | O | N | C | Si | Fe | Ni | Nb | Y |
|---|---|---|---|---|---|---|---|---|
| Intended | Low | Low | Low | 30 | 40 | 40 | 80 | 60 |
| A. Electrode Analysis (ppm) | 56 | 16 | 11 | <10 | 2 | 12 | <25 | 9 |
| B. Addition Through Patches | 108 | 0 | 51 | 38 | 133 | 55 | 80 | 400 |
| C. Total Composite Electrode | 164 | 16+ | 62 | 38–48 | 135 | 67 | 80–105 | 409 |
| D. Final Ingot (ppm) | 56 | 8 | 43 | 35 | 56 | 22 | 70 | 52 |
| E. Retention (%) | 34 | — | 69 | 73–92 | 41 | 33 | 74–87 | 13 |

Table II compares wire made by this process with other routes. Ingot No. 3, patch doped with C, Si, Fe, Ni Nb and $Y_2O_3$ was found to contain the elements added and give 0.020 inch diameter wire with better resistance to oxygen embrittlement and grain growth at 2100°C for 2 minutes and to grain growth at 1300°C. for 1 ½ hours and 2000°C. for half an hour than wire made from an undoped tantalum ingot (No. 1) or from a tantalum ingot (No. 2) doped with yttrium metal only, placed in longitudinal sawed slots in the electrode. In the table the number of bends to breakage (average of six tests) after 2 min. in 2μ air pressure at 2100°C represents resistance to embrittlement by oxygen. The grain size is in ASTM units and the larger the number, the smaller the grain size.

TABLE II

| Ingot Number | Impurity and Dopant Content of Bars From Which .020" Dia Tantalum Wire was Made (Parts per million) | | | | | | | | No. of Bends (Ave. of 6 tests) | Grain Size (ASTM) | | |
|---|---|---|---|---|---|---|---|---|---|---|---|---|
| | O | N | C | Si | Fe | Ni | Nb | Y | | A* | B | C |
| 1 | — | — | 12 | <10 | 3 | 6 | <25 | — | 0.25 | 6 | — | >1 |
| 2 | 42 | 12 | 23 | <10 | <1 | 17 | <25 | 30 | 2.21 | 7 | 7½ | 7½ |
| 3 | 56 | 8 | 43 | 35 | 56 | 22 | 70 | 52 | 2.96 | 8 | 9 | 8 |

*
A: 2 min. at 2100°C.
B: 1½ hr. at 1300°C
C: ½ hr. at 2000°C.

EXAMPLES 2, 3, 4, and 5

Four other patch doped tantalum ingots, made as described in Example 1 were fabricated to wire and other products. The chemical composition as indicated by Table III, below, of samples from final ingots in fabrication were such as to confer good resistance to grain growth and to oxygen embrittlement.

TABLE III

| Ingot Number | Chemical Composition of Final Ingots from Patch Doped Initial Tantalum Ingots (Parts per Million) | | | | | | | | Y added (as $Y_2O_3$) to Initial Ingot (ppm Y) |
|---|---|---|---|---|---|---|---|---|---|
| | O | N | C | Si | Fe | Ni | Nb | Y | |
| 1 | 48 | 20 | 15 | 39 | 37 | 18 | 54 | * | 0 |
| 2 | 60 | 8 | 32 | 22 | 29 | 14 | 47 | 37 | 200 |
| 3 | 72 | 10 | 47 | 37 | 28 | 14 | 49 | 57 | 400 |
| 4 | 133 | 11 | 45 | 32 | 23 | 14 | 55 | 67 | 400 |

* not detectable

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Alloy production method for introducing minority alloying ingredients of higher volatility and lower melting point into a majority metallic component comprising,
    mixing powders of the alloying ingredients with powders of the majority metal and forming coherent compacts of such mixtures as patches,
    melting and resolidifying the majority metal to form an elongated bar of the majority metal as a first melt ingot,
    applying said patches as an axial array along the surface of said bar, and
    re-melting the patched bar progressively along its length and resolidifying the melt as a final ingot to controllably and continuously introduce the alloying ingredients and majority metal into the melt with the majority metal content of the patches acting as a wick during melting, and to homogenize the dispersion of alloying ingredients throughout the majority metal in the final ingot and predictably maintain desired proportions of alloy ingredients.

2. Alloy production method in accordance with claim 1 wherein the patched bar is used as the consumable electrode of a consumable electrode melting process.

3. Alloy production method in accordance with claim 1 wherein the ingot form of the bar is modified prior to patching and re-melting.

4. Alloy production method in accordance with claim 3 wherein the bar is formed by arc melting.

5. Alloy production method in accordance with claim 3 wherein the bar is formed by electron beam melting.

6. Alloy production method in accordance with claim 1 wherein said majority metal is selected from the class consisting of the elements: tantalum columbium, molybdenum, hafnium, zirconium, tungsten, and alloys containing one or more of such elements as more than 80 weight percent thereof.

7. Alloy production method in accordance with claim 1 wherein said majority metal comprises tantalum.

8. Alloy production method in accordance with claim 1 wherein said patches are isostatically pressed.

9. Alloy production method in accordance with claim 1 wherein said patches are pressed in a die.

10. Alloy production method in accordance with claim 1 wherein said patches are presintered.

11. Alloy production method in accordance with claim 8 wherein said presintering step is combined with welding said patches on the bar.

12. Alloy production method for introducing minority alloying ingredients into a starting metal comprising,
    forming an elongated bar with a length series of alloy patches along the bar with said alloy patches comprising a high melting majority component and minority components of alloying elements of lower melting point,
    melting the patched bar progressively along its length so that the bar end and adjacent patch ends simultaneously melt to produce a continuing simultaneous feeding of molten starting metal with molten minority alloying ingredients,
    stirring said molten materials together, and resolidifying said molten materials to produce an alloy of said starting materials with the minority ingredients.

13. Alloy production method in accordance with claim 12 wherein said starting metal essentially comprises elemental tantalum and said majority metal essentially comprises elemental tantalum.

14. Alloy production method in accordance with claim 13 wherein the minority alloying ingredients comprise oxygen, carbon, silicon, iron, nickel, niobium and yttrium, each provided in the patches in amounts sufficient to allow for boil-off in the course of melting to retain predetermined amounts thereof in the resolidified alloy product.

15. Alloy production method in accordance with claim 12 wherein the melting, stirring and resolidification is carried out by consutrode melting using said patched elongated bar as the consumable electrode thereof to produce said resolidified alloy product as a final ingot product.

* * * * *